United States Patent
Buck

[19]

[11] Patent Number: 5,876,571
[45] Date of Patent: Mar. 2, 1999

[54] PROCESS FOR MAKING CATION EXCHANGE MEMBRANES WITH ENHANCED ELECTROCHEMICAL PROPERTIES

[75] Inventor: Warren Howard Buck, Aston, Pa.

[73] Assignee: E. I. du Pont de Nemours and Company, Wilmington, Del.

[21] Appl. No.: 854,195

[22] Filed: May 9, 1997

Related U.S. Application Data

[60] Provisional application No. 60/017,252 May 10, 1996.
[51] Int. Cl.$^6$ ................. C07C 1/00; B05D 5/12; C08J 5/20; C08F 5/20
[52] U.S. Cl. ............. 204/157.15; 427/115; 427/243; 427/337; 521/27; 521/28; 521/30; 521/33
[58] Field of Search ............... 204/157.15; 429/33, 429/42; 427/115, 243, 337; 521/27, 28, 30, 33

[56] References Cited

U.S. PATENT DOCUMENTS

| | | | |
|---|---|---|---|
| 4,012,303 | 3/1977 | D'Agostino et al. | 204/159.17 |
| 4,129,617 | 12/1978 | Machi et al. | 260/879 |
| 4,132,682 | 1/1979 | Seita et al. | 521/27 |
| 4,154,909 | 5/1979 | Seita et al. | 521/32 |
| 4,200,538 | 4/1980 | Seita et al. | 210/500 M |
| 4,287,032 | 9/1981 | Pellegri | 204/128 |
| 4,385,130 | 5/1983 | Molinski et al. | 521/31 |
| 4,481,306 | 11/1984 | Markus et al. | 521/31 |
| 4,506,035 | 3/1985 | Barnett et al. | 521/53 |
| 4,602,045 | 7/1986 | Markus et al. | 521/27 |
| 4,818,637 | 4/1989 | Molter et al. | 429/15 |
| 5,128,014 | 7/1992 | Banerjee | 204/296 |
| 5,264,093 | 11/1993 | Banerjee | 204/157.15 |
| 5,330,626 | 7/1994 | Banerjee | 204/157.15 |
| 5,330,860 | 7/1994 | Grot et al. | 429/42 |
| 5,415,888 | 5/1995 | Banerjee et al. | 427/125 |
| 5,417,832 | 5/1995 | Pellegrino et al. | 204/296 |

FOREIGN PATENT DOCUMENTS 0 057 065   1/1982   European Pat. Off. .

OTHER PUBLICATIONS

Japanese Abstract –Appln. No. 83JP–162512, Sep. 6, 1983, Cation–exchange Polymer Film Production—by Irradiating Inert Polymer Film With Ionising Radiation, Immersing in Tri:fluoro–styrene and Sulphonating, Assignee, Chlorine Eng. Co. Ltd.

Japanese Abstract—Accession Number 79–27033B/14, Appln. No. 77JP–093099, Aug. 2, 1977, Cation Exchange Membrane Production—for Improved Electrolysis of Alkali Chloride solution, by Irradiating Fluorine System Membrane and UV Light, Assignee Osaka Soda KK.

Abstract, BE–891862–A, Jul. 22, 1982, Selectively Permeable Fluoro–polymer Cation–exchange membrane—Irradiated and Grafted With Fluorinated Monomer, Especially for Chlorine–alkali Electrolysis Cell, Assignee ICI Australia Ltd.

Abstract, AU8287081–A, May 12, 1983, High Capacity Cation Exchange resins for Permselective Membranes—are Prepared by Modified Grafting Polymerisation, Assignee ICI Australia Ltd.

(List continued on next page.)

*Primary Examiner*—Kathryn Gorgos
*Assistant Examiner*—Edna Wong

[57] ABSTRACT

A process for making a cation exchange membranes includes impregnating a film of highly fluorinated sulfonic acid polymer in sulfonyl fluoride form with a compound selected from the group having the formula $R\text{-}SO_2F$, wherein R is a straight chain, branched or cyclic, highly fluorinated alkyl group having 1 to 30 carbon atoms. The impregnated film is irradiated with the radiation dose being in the range of 0.1 to 15 MRad. After irradiation, the film is hydrolyzed to form the membrane. The membranes have enhanced electrochemical properties when employed in electrochemical cells including improved performance under low humidity conditions.

6 Claims, 3 Drawing Sheets

OTHER PUBLICATIONS

Abstract, J60238327, May 11, 1984, Ion Exchange Membrane Manufacture—by Polymerising Monomer Impregnated in Fluorinated Olefin Type Polymer Base Material, Assignee Asahi Glass KK.

Abstract, J57073027–A, May 7, 1982, Graft Polymerisation—by Generating Polymer Radical, Keeping Polymer in Rolled Sheet, and Supplying to Liquid Containing Reactive Monomer, Assignee Yuasa Batter Co. KK: (JAAT) Japan Atomic Energy Res; (GIJU–) Shin Gijutsu Kaihatsu.

PROCESS FOR MAKING CATION EXCHANGE MEMBRANES WITH ENHANCED ELECTROCHEMICAL PROPERTIES

The Government has rights in this invention pursuant to U.S. Army Contract No. DAA601-94-C-3435.

BACKGROUND OF THE INVENTION

This application claims benefit of U.S. Provisional Application Ser. No. 60/017,252, filed May 10, 1996.

The present invention relates to a process for making cation exchange membranes having enhanced properties for use in electrochemical cells.

A variety of known electrochemical cells fall within a category of cells often referred to as solid polymer electrolyte (SPE) cells. An SPE cell typically employs a membrane of a cation exchange polymer which serves as a physical separator between the anode and cathode while also serving as an electrolyte. SPE cells can be operated as electrolytic cells for the production of electrochemical products or they may be operated as fuel cells for the production of electrical energy.

Perfluorinated sulfonic acid polymer membranes are particularly well-suited for use in SPE cells due to excellent chemical resistance, long life, and high conductivity. For such membranes to be conductive in an SPE cell, i.e., to transport cations across the membrane, the membrane must have a certain water content. In cells with aqueous reactants such as the chloralkali process which converts an aqueous sodium chloride solution to chlorine gas and an aqueous sodium hydroxide solution, the needed water is always available due to the membrane being in contact with the aqueous solutions on both sides of the membrane. However, in SPE cells employing gaseous reactants, it is usually necessary for efficient operation to humidify the gases entering the cell, i.e., use external humidification to maintain the water content of the membrane. For example, in a hydrogen/oxygen fuel cell employing a cation exchange membrane, protons are transported across the membrane from the anode to the cathode and, due to movement of protons to the cathode, water in the membrane is also transported away from the anode. Ultimately, if the water is not replenished, the membrane can dry out causing decreased conductivity and thus poor cell performance. Consequently, the hydrogen supplied to the anode (and sometimes also the air or oxygen supplied to the cathode) is typically humidified to prevent the membrane from drying out.

The need for external humidification of an SPE cell is generally considered a significant disadvantage due to the control system and water source (or water recycling system) needed to provide the proper humidity to the membrane. External humidification is particularly disadvantageous for fuel cells designed for use as automotive power sources or for portable electrical power sources due to the increased complexity and weight of a complete system.

SUMMARY OF THE INVENTION

In accordance with the invention, a process for making a cation exchange membrane is provided which includes impregnating a film of highly fluorinated sulfonic acid polymer in sulfonyl fluoride form with a compound selected from the group having the formula $R-SO_2F$, wherein R is a straight chain, branched or cyclic, highly fluorinated alkyl group having 1 to 30 carbon atoms. The impregnated film is irradiated with the radiation dose being in the range of 0.1 to 15 MRad, preferably about 1 to about 10 MRad. After irradiation, the film is hydrolyzed.

In a preferred form of the invention, the polymer of the film has a highly fluorinated carbon backbone and the side chain is represented by the formula $-(OCF_2CFR_f)_a-OCF_2CFR'_fSO_2F$, wherein $R_f$ and $R'_f$ are independently selected from F, Cl or a perfluorinated alkyl group having 1 to 10 carbon atoms, and a=0, 1 or 2. Most preferably, the polymer has a perfluorocarbon backbone and the side chain is represented by the formula $-O-CF_2CF(CF_3)-O-CF_2CF_2SO_2F$.

Preferably, the compound for impregnating the film comprises a compound of the formula $R-SO_2F$, wherein R is a straight chain, branched or cyclic, highly fluorinated alkyl group having 4 to 12 carbon atoms. It is preferable for the compound impregnating the polymer to be present in an amount of about 1% to about 75% by weight based on the weight of the film.

Cation exchange membranes made in accordance with the invention and membrane and electrode assemblies made with the membranes have enhanced properties. One particularly advantageous property is the capability of membranes to be used in SPE cells employing gaseous reactants under low humidity conditions. This is believed to be due to the ability of the membranes to retain water more effectively than membranes made conventionally. Accordingly, the invention can minimize and, in some applications, eliminate the need for external humidification.

DETAILED DESCRIPTION

Figure 1:
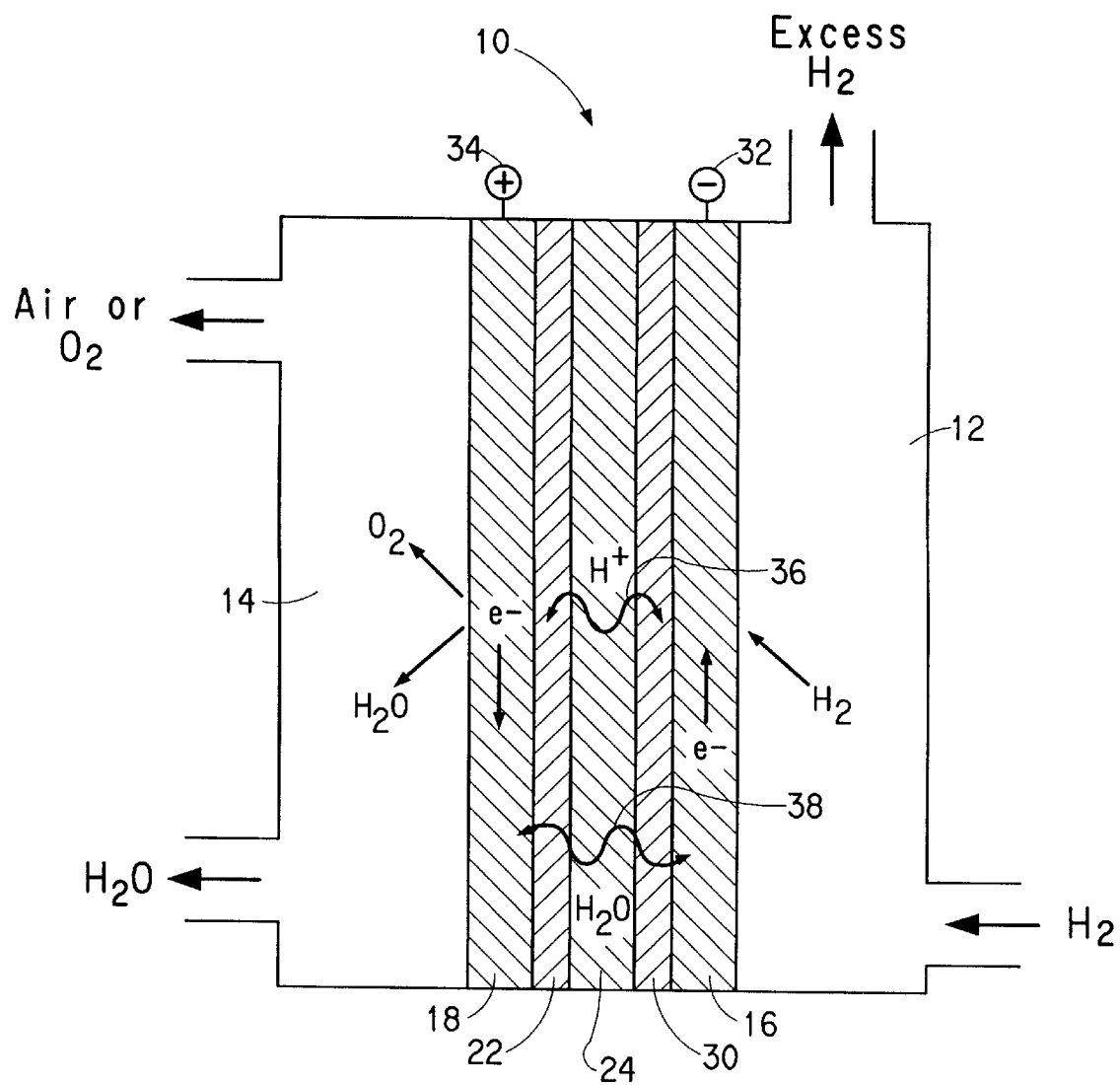
FIG. 1 is a schematic illustration of a hydrogen/oxygen fuel cell.

In a process for making a cation exchange membrane in accordance with the invention, a film of a highly fluorinated sulfonic acid polymer in sulfonyl fluoride form is used. "Highly fluorinated" means that at least 90% of the total number of halogen and hydrogen atoms are fluorine atoms. Most preferably, the polymer is perfluorinated.

In a preferred form of the invention, the highly fluorinated sulfonic acid polymer comprises a polymer backbone and recurring side chains attached to the backbone with the side chains carrying the sulfonyl fluoride groups ($-SO_2F$). For example, it is preferred to use copolymers of a first fluorinated vinyl monomer and a second fluorinated vinyl monomer having the sulfonyl fluoride group. Possible first monomers include tetrafluoroethylene (TFE), hexafluoropropylene, vinyl fluoride, vinylidine fluoride, trifluorethylene, chlorotrifluoroethylene, perfluoro (alkyl vinyl ether), and mixtures thereof. Possible second monomers include a variety of fluorinated vinyl ethers with a sulfonyl fluoride group.

A class of preferred polymers for use in the present invention include highly fluorinated polymers with a highly fluorinated carbon backbone and a side chain represented by the formula $-(OCF_2CFR_f)_a-OCF_2CFR'_fSO_2F$, wherein $R_f$ and $R'_f$ are independently selected from F, Cl or a perfluorinated alkyl group having 1 to 10 carbon atoms, and a=0, 1 or 2. The preferred polymers include, for example, polymers disclosed in U.S. Pat. Nos. 4,358,545 and 4,940,525. Most preferably, the polymer comprises a perfluorocarbon backbone and the side chain is represented by the formula —O—CF$_2$CF(CF$_3$)—O—CF$_2$CF$_2$SO$_2$F. Polymers of this type are disclosed in U.S. Pat. No. 3,282,875.

The equivalent weight of the cation exchange polymer can be varied as desired for use in the particular electrochemical cell. For the purposes of this patent application, equivalent weight is defined to be the weight of the polymer in sulfonic acid form required to neutralize one equivalent of NaOH. In the case where the polymer comprises a perfluorocarbon backbone and the side chain is —O—CF$_2$—CF(CF$_3$)—O—CF$_2$—CF$_2$—SO$_2$F, the equivalent weight preferably is 800–1500, most preferably 900–1200. The equivalent weight of the polymers disclosed in U.S. Pat. Nos. 4,358,545 and 4,940,525 is preferably somewhat lower, e.g., 600–1300.

The highly fluorinated sulfonic acid polymer in sulfonyl fluoride form is thermoplastic and it is advantageous to make the film for use in the process by conventional melt extrusion techniques. Solution film casting techniques using suitable solvents can also be used.

If desired, the film can be a laminate of two polymers such as two highly fluorinated polymers having different ion exchange capacities. Such films can be made by laminating two films or co-extruding a film with the two polymer layers. Alternatively, one or both of the laminate components can be cast from solution or dispersion. When the film is a laminate, the chemical identities of the monomer units in the additional cation exchange polymer can independently be the same as or different from the identities of the analogous monomer units of the first cation exchange polymer.

The thickness of the film can be varied as desired for a particular electrochemical cell application. Typically, the thickness of the film is generally less than about 250 μm, preferably in the range of about 25 μm to about 150 μm.

The film may optionally include a porous support for the purposes of improving mechanical properties, for decreasing cost and/or other reasons. The porous support of the film may be made from a wide range of components. The porous support of the present invention may be made from a hydrocarbon such as a polyolefin, e.g., polyethylene, polypropylene, polybutylene, copolymers of those materials, and the like. Perhalogenated polymers such as polychlorotrifluoroethylene may also be used.

For resistance to thermal and chemical degradation, the support preferably is made of a highly fluorinated polymer, most preferably a perfluorinated polymer. For example, the polymer for the porous support can be a microporous film of polytetrafluoroethylene (PTFE) or a copolymer of tetrafluoroethylene with

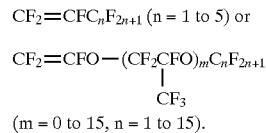

Microporous PTFE films and sheeting are known which are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids.

Alternatively, the porous support may be a fabric made from fibers of the polymers discussed above woven using various weaves such as the plain weave, basket weave, leno weave, or others.

A film can be made using the porous support by coating the cation exchange polymer on the support so that the coating is on the outside surfaces as well as being distributed through the internal pores of the support. This may be accomplished by impregnating the porous support solution with the cation exchange polymer in sulfonyl fluoride form using a solvent which is not harmful to the polymer of the support under the impregnation conditions and which can form a thin, even coating of the cation exchange polymer on the support. Alternately or in addition to impregnation, thin films of the ion exchange polymer can be laminated to one or both sides of the porous support. For a film made by impregnation of a porous support, laminating a thin film is advantageous for preventing bulk flow through the membrane which can occur if large pores remain in the film.

In accordance with the process of this invention, the film of the highly fluorinated sulfonic acid polymer is impregnated with a highly fluorinated alkyl sulfonyl fluoride compound selected from the group having the formula R-SO$_2$F, wherein R is a straight chain, branched or cyclic, highly fluorinated alkyl group having 1 to 30 carbon atoms. "Highly fluorinated" means that at least 90% of the total number of halogen and hydrogen atoms are fluorine atoms. Preferably, R is a straight chain, branched or cyclic, highly fluorinated alkane group having 4 to 12 carbon atoms. For the purposes of ease of impregnation with the highly fluorinated alkyl sulfonyl fluoride compound, it is desirable to use a compound which is a liquid at the temperature the impregnation is to be carried out. Preferred compounds are perfluorinated and include perfluorobutyl sulfonyl fluoride, perfluorohexyl sulfonyl fluoride, and perfluorooctyl sulfonyl fluoride since they are liquids at room temperature and no special conditions need be employed for impregnation. Perfluorooctyl sulfonyl fluoride is a particularly preferred compound for the practice of the present invention.

If is desired to use other compounds which are volatile at room temperature or which have low boiling points, high pressure conditions may be desirable. Alternately, impregnation my be done in the gas phase which may make it desirable for the irradiation step be done simultaneously or subsequently but with exposure of the film to an atmosphere of the impregnating compound. When compounds with high melting points are employed, elevated temperature conditions or a solution of the compound are typically employed for effective impregnation.

Preferably, the highly fluorinated alkyl sulfonyl fluoride compound impregnating the polymer is present in an amount of about 1% to about 75% by weight based on the weight of the film. In this range and when the highly fluorinated alkyl sulfonyl fluoride compound is a liquid, it is often desirable to employ a suitable carrier for the highly fluorinated alkyl sulfonyl fluoride compound to aid in its even distribution of the compound through the polymer. Preferably, the solvent employed is volatile to enable the solvent to be easily removed with the highly fluorinated alkyl sulfonyl fluoride compound remaining in the polymer. Suitable solvents are any of various known fluorinated solvents such as perfluoroalkanes having 4 to 8 carbon atoms. Perfluorohexane has been found to be particularly suitable as a carrier.

After the film is impregnated with the highly fluorinated alkyl sulfonyl fluoride compound, the film is irradiated. Preferably, a source of non-spark-producing ionizing radiation is employed. The sources of this type of radiation include, but are not limited to (1) gamma sources, such as Co-60 and Cs-137, (2) beta sources (often referred to as electron beam accelerators or linear accelerators, and (3)

x-rays. Ionizing radiation produces free radicals in the material being irradiated. The behavior of the free radicals produced is determined by the nature of the absorbing medium. The main difference between these three sources is the manner in which the radiation travels through the material being irradiated.

The most common sources of gamma radiation are Co-60 and Cs-137. Co-60 is made by pre-forming non-radioactive Co into rods or bars, then subjecting them to a neutron source such as the neutrons produced in a nuclear power plant.

Gamma radiation is emitted in a complete sphere, requiring the target material to completely surround the source if all of the irradiation is to be utilized. Gamma radiation is absorbed on a logarithmic basis as it travels in a material. In order to get a more uniform dose in the material, double sided exposure may be used, but is not necessary with a relatively thin material such as a chloralkali membrane. Gamma rays have a major advantage, penetration. This is not important in irradiating thin membranes.

The major disadvantages of radioactive sources are (1) high maintenance cost (replacement of source material), (2) the need for extreme safety precautions, (3) relatively low dose rate, and (4) the problems associated with transporting, storing, and disposing of highly radioactive substances. In addition, since the radioactive decay cannot be controlled (turned on and off) the facility must be operated continuously to realize a high efficiency.

X-rays are produced when high energy electrons are used to bombard metals. The efficiency of the x-ray source is determined by the molecular or atomic weight of the target and by the energy (accelerating voltage) of the electrons. The higher the molecular weight of the target material, the greater the efficiency. The efficiency is also proportional to the accelerating voltage. The penetration characteristics of x-rays are 5–20% greater than those of gamma rays.

The source of beta radiation is an electron beam accelerator. Electrons can be accelerated by (1) high DC voltages, (2) electric pulses, (3) magnetic pulses, or (4) a combination of these three. COCKCROFT-WALTON, isolated core, resonant transformer, DYNAMITRON (high voltage generated by a set of cascade rectifiers coupled to an oscillator), KLYSTRON (evacuated electron beam generator) and linacs are some of the names given to the techniques of producing high voltages. Absorption of high energy electrons in material is such that 90% of the beam energy may be used with a maximum to minimum dose ratio of 1.4:1 using a single pass under the beam.

The main advantages of the electron beam accelerators are the (1) high power and high throughput, (2) relatively low unit cost, (3) high dose rate, and (4) intrinsic safety. In addition, since electron accelerators may be turned off, the facilities do not have to be operated continuously. The main disadvantage of electron beam accelerators is the relatively small penetration of the electrons, about 2.1 cm in water for a 5 megarad source. This is not a significant disadvantage for irradiation of membranes, which are thin. Therefore, electron beam accelerators are the preferred source of ionizing radiation for this invention.

In the irradiation process, the membrane is exposed to irradiation with a radiation dose being in the range of about 0.1 to about 15 MRad, preferably about 1 to about 10 MRad. The total dosage of radiation is a function of the time of each exposure, the dose rate, and the number of exposures. Preferably the number of exposures should be low, most preferably one. The dose rate will depend on the type of radiation used, the device used to generate the radiation, and the energy input to the source of radiation. For a given dose rate, the time of exposure can be varied to provide the preferred total dosage. A preferred way of controlling the time of exposure is to vary the speed of a conveyor system carrying the membrane through the irradiation zone.

The membranes may also be irradiated in a so-called "shield pack" or a package or container which is not effected by the radiation. Such irradiation may be performed under ambient atmosphere, under vacuum or otherwise. Such a package or container prevents damage to the membrane from excessive handling.

After irradiation, the film is hydrolyzed to convert the polymer in sulfonyl fluoride form (including any sulfonyl fluoride groups contributed by the highly fluorinated alkyl sulfonyl fluoride compound impregnated into the film) to the sulfonate form. This may be carried out by hydrolysis using methods known in the art. For example, the membrane may be hydrolyzed to convert it to the sodium sulfonate form by immersing it in 25% by weight NaOH for about 16 hr at a temperature of about 90° C. followed by rinsing the film twice in deionized 90° C. water using about 30 to about 60 minutes per rinse. Another possible method employs an aqueous solution of 6–20% of an alkali metal hydroxide and 5–40% polar organic solvent such as dimethyl sulfoxide with a contact time of at least 5 minutes at 50°–100° C. followed by rinsing for 10 minutes. After hydrolyzing, the membrane can be converted if desired to another ionic form by contacting the membrane in a bath containing a 1% salt solution containing the desired cation or, to the sulfonic acid form, by contacting with an acid such as 10% nitric acid and rinsing. For fuel cell use, the membrane is typically in the sulfonic acid form.

The membranes made in accordance with the invention are useful in electrochemical cells, particularly fuel cells. With reference to FIG. 1, a hydrogen/oxygen fuel cell is shown schematically. For employing membranes in accordance with the invention, the fuel cell preferably is the type which uses a membrane and electrode assembly (MEA) 10 as will be described in more detail hereinafter. The fuel cell utilizes a hydrogen source supplied to an anode compartment 12 and an oxidizer source such as air or oxygen supplied to an a cathode compartment 14.

MEA 10 includes a cation exchange membrane 24 which is an electrolyte (for proton transport) and separates the anode compartment from the cathode compartment. A porous anode current collector 16 and a porous cathode current collector 18 are provided to conduct current from the cell. Cathode current collector 18 is electrically connected to positive terminal 34 and anode current collector 16 is electrically connected to negative terminal 32. MEA 10 also includes a catalyst layer 22 which functions as the cathode and is in contact with and between the cathode-facing surface of membrane 24 and the cathode current collector 18. A catalyst layer 30 which functions as the anode is disposed between and is in contact with the anode-facing surface of the membrane 24 and anode current collector 16.

The catalyst layers 22 and 30 may be made from well-known electrically conductive, catalytically active particles or materials and may be made by methods well known in the art. The catalyst layer 22 may be formed as a film of a polymer which serves as a binder for the catalyst particles. The binder polymer can be a hydrophobic polymer, a hydrophilic polymer or a mixture of such polymers. For example, in an MEA using a perfluorinated sulfonic acid polymer membrane and a platinum catalyst, the binder polymer can also be perfluorinated sulfonic acid polymer and the catalyst can be a platinum catalyst supported on carbon particles. In the catalyst layers 22 and 30, the particles are preferably uniformly dispersed in the polymer to assure that a uniform and controlled depth of the catalyst is maintained, preferably at a high volume density with the particles being in contact with adjacent particles to form a low resistance conductive path through catalyst layer.

The catalyst layers 22 and 30 formed on the membrane should be porous so that they are readily permeable to the gases and water which are consumed and produced in the cell. The average pore diameter is preferably in the range of 0.01 to 50 $\mu$m, most preferably 0.1 to 30 $\mu$m. The porosity is generally in a range of 10 to 99%, preferably 10 to 60%.

Known methods for forming the catalyst layers 22 and 30 may be used such as the method disclosed in U.S. Pat. No. 5,415,885.

The anode current collector 16 and the cathode current collector 18 may be constructed as is known in the art. These structures may be the same or different. Access of oxygen, typically air to the catalyst layer is provided by employing a porous cathode current collector 18. Similarly, the anode current collector 16 is porous to permit the access of the hydrogen. While conductive metal screens, porous plates or other materials may also be used, a preferred material for the current collectors is conductive paper or cloth made of carbon fibers with suitable conductivity and porosity. Typically, the current collectors are bonded to the MEA by the application of heat and pressure or alternatively may held in contact with the electrodes by compressive forces in the cell.

As illustrated in FIG. 1, when the cell is operated, $H^+$ ions are transported across the membrane from anode to cathode as indicated by arrow 36. Electrical power is provided by the electrons which flow from the negative terminal 32 to the positive terminal 34 through an external circuit (not shown). Water being formed in the reaction at the cathode 18 diffuses to some extent across the membrane towards the anode 30. However, the movement of $H^+$ ions form the anode 30 to the cathode 18 causes water to move in this direction also and is sometimes referred to as electroosmotic drag. Water movement thus is shown by the double-headed arrow 38, although typically the net water transport is from the anode to the cathode causing the membrane to dry out in the absence of external humidification.

As illustrated in the Examples which follow, a cell employing a membrane in accordance with the invention provides improved performance under conditions with no external humidification. Based on this improved performance but without any intent to be limited to any particular theory, it is believed the membrane when employed in a cell as illustrated in FIG. 1 provides the enhanced ability to retain water in the membrane under low humidity conditions.

EXAMPLES

The invention is illustrated in the following example but there is no intend to limit the invention to the particular embodiment illustrated. Parts and percentages are by weight unless otherwise indicated.

Example 1

In this example, a membrane is made using a 0.005 inch (125 $\mu$m) thick film of sulfonated perfluorocarbon copolymer a perfluorocarbon backbone and side chains of —O—$CF_2CF(CF_3)$—O—$CF_2CF_2SO_2F$ (equivalent weight of 1080) treated with perfluorooctyl sulfonyl fluoride (POSF) and irradiated (7 MRad).

25 ml of POSF is mixed with 475 ml of perfluorohexane (5% by volume) and placed in a glass tray. A 1.66 g piece of the film (12.7 cm×12.7 cm) described above, in the sulfonyl fluoride form, is placed in the tray such that it is covered with the solution of POSF in perfluorohexane. The tray is covered and the film is allowed to soak in the solution for one hour at 23° C. After one hour the film is removed from the tray and allowed to dry in air for 16 hours. The film is then weighed and found to have increased in weight by 2.5%. This film is sealed in a metallized polyethylene terephthalate bag using a vacuum bag sealer and irradiated with 3 MeV electrons to a total dose of 7 MRad. As controls, films that are not treated with POSF are similarly sealed in metallized polyethylene terephthalate bags and irradiated at total doses of 5 and 10 MRad.

After irradiation a catalyst layer is applied to each side of the films and the films hydrolyzed using the methods described in U.S. Pat. No. 5,330,860. As an additional control, an untreated, unirradiated film is also coated with a catalyst layer and hydrolyzed. These membrane-electrode assemblies have a final catalyst loading of 0.5 mg Pt/cm$^2$ on both the cathode and anode sides.

The membrane-electrode assembly to be tested is placed in a 50 cm$^2$ fuel cell which is attached to a test station purchased from Fuel Cell Technologies, Inc., 108 Shirlane Place, Los Alamos, N. Mex. The cell is heated to 70° C. and the anode gas flow rate is set to 1 l/min. of hydrogen and the cathode gas flow rate set to 2.5 l/min. air, both at 30 psig (210 kPa). Both anode and cathode gasses pass through saturators filled with deionized water. The saturators are heated to 80° C. A polarization curve is measured under these conditions, then the cell temperature is increased to 85° C. and the saturator temperatures to 90° C. The anode gas flow rate is set to 1 l/min. and the cathode gas flow rate is set to 2.5 l/min. When the cell and saturators had come to temperature, a polarization curve is measured under these conditions. The cell temperature is then reduced to 50° C. and the saturator temperatures to 60° C. with the same gas flow rates. When the cell and saturators reached temperature, a third polarization curve is measured.

Figure 2:
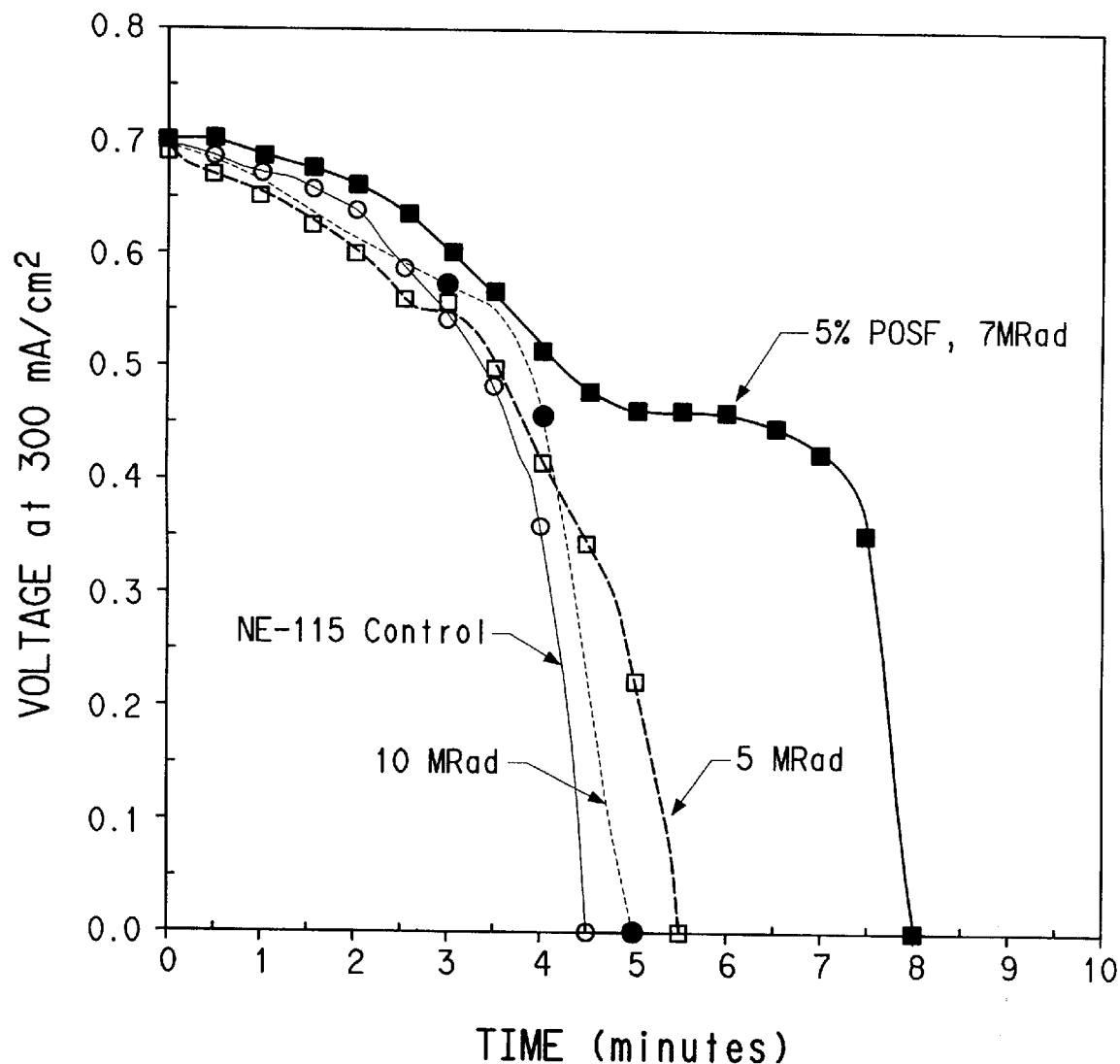
FIGS. 2 and 3 are graphical representations of voltage decay over time in hydrogen/oxygen fuel cells after eliminating external humidification showing results obtained with membranes in accordance with the invention compared to control membranes.

After the polarization curve has been measured at a cell temperature of 50° C., the current density is adjusted to 300 mA/cm$^2$. The anode and cathode gas pressures are reduced to 0 psig, and the flow rates are again set at 1 l/min. of hydrogen at the anode and 2.5 l/min. of air at the cathode. The voltage at this current density is noted, then the anode and cathode gasses are diverted from the saturators directly into the fuel cell. When the feed gasses are so diverted, they are unhumidified. The cell voltage is monitored as a function of time until zero voltage is reached. The results of these voltage decay experiments are shown in FIG. 2. The film that is not treated with POSF and unirradiated is denoted "NE-115 control", and the time required for decay to zero voltage is 4.5 minutes. Similarly, the samples that are not treated with POSF but are irradiated with 5 and 10 MRad decayed to zero in 5.5 and 5 minutes, respectively. The sample treated with 5% POSF in perfluorohexane as described above and irradiated at a total dose of 7 MRad maintained voltage significantly longer, requiring 8 minutes to decay to zero voltage.

Example 2

In this example, a membrane is made using a 0.002 inch (50 $\mu$m) thick film of sulfonated perfluorocarbon copolymer with a perfluorocarbon backbone and side chains identical to the film used in Example 1 treated with perfluorooctyl sulfonyl fluoride (POSF) and irradiated (5 MRad).

A mixture of 50 mls of POSF is mixed with 450 ml of perfluorohexane (10% by volume) and placed in a glass tray. A 12.7 cm×12.7 cm piece of the sulfonated perfluorocarbon copolymer described above, in the sulfonyl fluoride form, is placed in the tray such that it is covered with the solution of POSF in perfluorohexane. The tray is covered and the film is allowed to soak in the solution for one hour at room temperature (23° C.). After one hour of soaking, the film is removed from the tray and allowed to dry in air for 16 hours. The amount of weight gained is found to be 5%. This film is sealed in a metallized polyethylene terephthalate bag using a vacuum bag sealer and irradiated with 3 MeV electrons to a total dose of 5 MRad. As a control an untreated, unirradiated sample of the same 0.002 inch (50 $\mu$m) thick membrane is used. After irradiation, both the treated and control membranes are hydrolyzed and a catalyst layer applied as in Example 1. Final catalyst loadings on treated and control membrane-electrode assemblies are 0.6 mg Pt/cm$^2$ on both cathode and anode sides.

The membrane-electrode assembly to be tested is placed in a 50 cm$^2$ fuel cell which is then attached to a fuel cell test station similar to that described in Example 1, but modified so that fuel gas could be humidified by direct injection of water vapor into the fuel gas streams. This modification allowed more precise control of the degree of humidification of the fuel gasses. The cell is heated to 70° C. and the anode gas flow rate is set to 1 l/min. of hydrogen, fully humidified with water vapor at 135° C. The cathode flow rate is set to 2.5 l/min. of humidified air, also at 135° C. Both gasses are at a pressure of 30 psig (200 kPa). A polarization curve is measured under these conditions, then the cell temperature is increased to 85° C. Fuel gas flow rates and humidified gas temperature are unchanged. When the cell had come to temperature, a polarization curve is measured under these conditions. The cell temperature is then reduced to 50° C. with gas flows and humidifier temperature remaining the same. When the cell had cooled to 50° C., a third polarization curve is measured.

Figure 3:
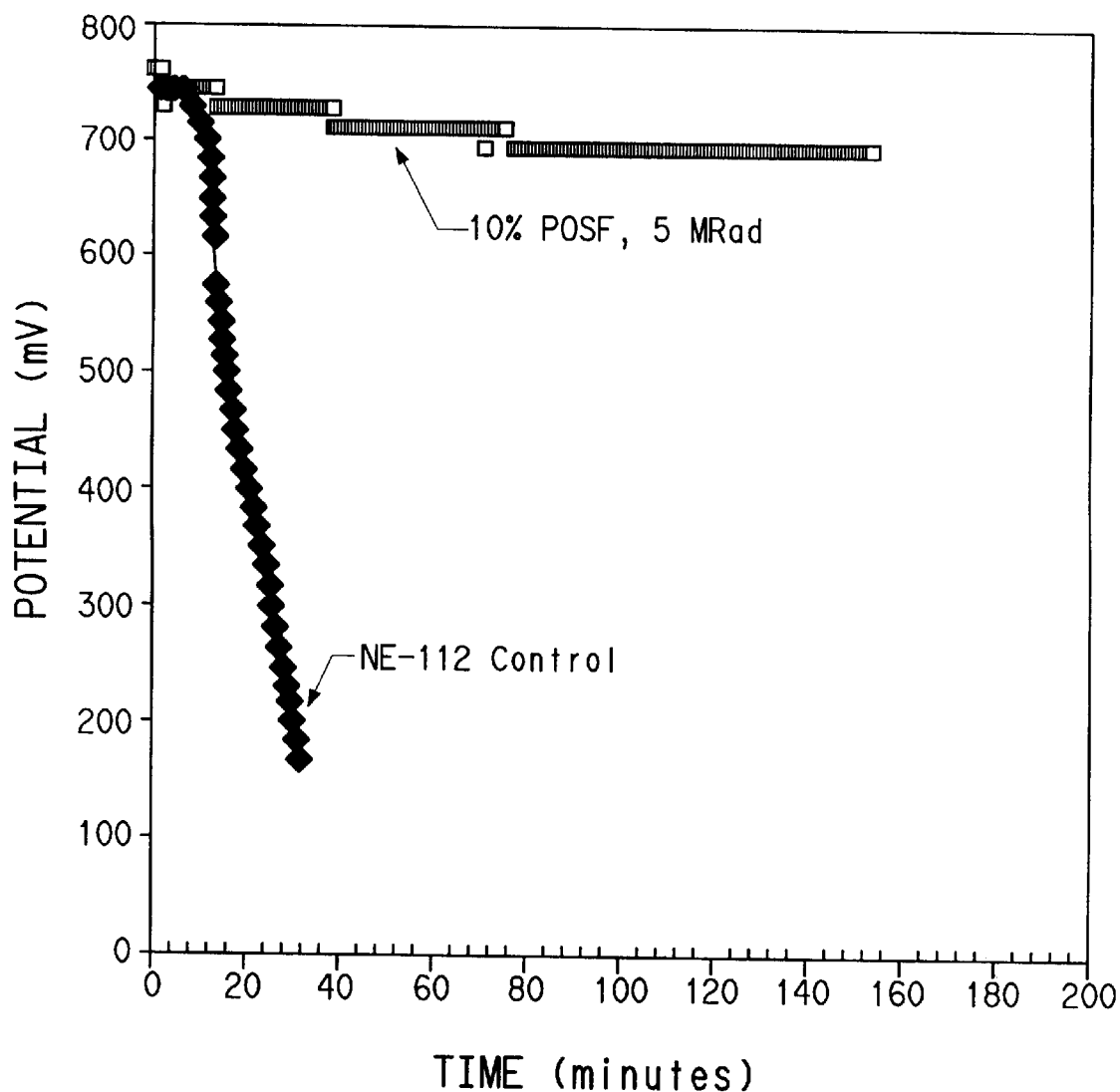

After the three polarization curves are run as described above, the membrane under test is given additional conditioning by holding it a constant voltage of 0.5 V at 50° C. with 1 l/min. of 100% relative humidity hydrogen flowing through the anode and 2.5 l/min. of 100% relative humidity air flowing through the cathode. The test membrane is thus conditioned for 30 minutes. After this conditioning, the current density is adjusted to 300 mA/cm$^2$. The anode and cathode gas pressures are reduced to 0 psig. The water vapor injection pumps are turned off, and the anode and cathode gas flow rates remained at 1.0 and 2.5 l/min., respectively. The cell voltage is monitored as a function of time, with the results shown in FIG. 3. FIG. 3 shows that the sample treated with 10% POSF in perfluorohexane maintains voltage for long periods even in the absence of external humidification. The potential for the control sample falls below 200 mV 24 minutes after the water injection pumps are turned off. The treated sample, on the other hand, still provides a potential of 700 mV after 140 minutes with no external humidification.

What is claimed is:

1. A process for making a cation exchange membrane comprising:

impregnating a film of highly fluorinated sulfonyl fluoride polymer with a compound having the formula R-SO$_2$F, wherein R is a straight chain, branched or cyclic, highly fluorinated alkyl group having 1 to 30 carbon atoms;

irradiating said film after impregnating with said compound, said irradiating being carried out to provide a radiation dose in the range of about 0.1 to about 15 MRad; and hydrolyzing said film after said irradiating.

2. The process of claim 1 wherein said polymer of said film comprises a highly fluorinated carbon backbone and a side chain having the formula —(OCF$_2$CFR$_f$)$_a$—OCF$_2$CFR'$_f$SO$_2$F, wherein R$_f$ and R'$_f$ are independently selected from F, Cl or a perfluorinated alkyl group having 1 to 10 carbon atoms, and a=0, 1 or 2.

3. The process of claim 2 wherein said polymer comprises a perfluorocarbon backbone and said side chain has the formula —O—CF$_2$CF(CF$_3$)—O—CF$_2$CF$_2$SO$_2$F.

4. The process of claim 1 wherein said compound for impregnating comprises a compound of the formula R-SO$_2$F, wherein R is a straight chain, branched or cyclic, highly fluorinated alkyl group having 4 to 12 carbon atoms.

5. The process of claim 1 wherein said radiation dose is about 1 to about 10 MRad.

6. The process of claim 1 wherein said film has a weight and said compound impregnating said polymer is present in an amount of about 1% to about 75% by weight based on said weight of the film.

* * * * *